(12) United States Patent
Amano (10) Patent No.: US 8,811,209 B2
(45) Date of Patent: Aug. 19, 2014

(54) COMMUNICATION DEVICE, COMPUTER READABLE RECORDING MEDIUM, COMMUNICATION METHOD AND COMMUNICATION SYSTEM

(75) Inventor: Katsuhiro Amano, Toyota (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 197 days.

(21) Appl. No.: 13/358,879

(22) Filed: Jan. 26, 2012

(65) Prior Publication Data

US 2012/0188893 A1 Jul. 26, 2012

(30) Foreign Application Priority Data

Jan. 26, 2011 (JP) ................................. 2011-013582

(51) Int. Cl.
*H04L 12/26* (2006.01)

(52) U.S. Cl.
USPC ............................. 370/252; 370/347; 370/503

(58) Field of Classification Search
USPC .......................................... 370/252, 337, 347
See application file for complete search history.

(56) References Cited

U.S. PATENT DOCUMENTS

| 2009/0232113 A1* | 9/2009 | Tamaki | 370/337 |
| 2011/0156767 A1* | 6/2011 | Ahn et al. | 327/142 |
| 2011/0211471 A1* | 9/2011 | Yabe et al. | 370/252 |
| 2011/0216787 A1* | 9/2011 | Ai et al. | 370/503 |

FOREIGN PATENT DOCUMENTS

| JP | 2004364169 A | 12/2004 |
| JP | 2007-116491 A | 5/2007 |

OTHER PUBLICATIONS

Notice of Reasons for Rejection issued in corresponding Japanese Patent Application 2011-013582 dated Dec. 18, 2012.

* cited by examiner

*Primary Examiner* — Donald Mills
*Assistant Examiner* — Henry Baron
(74) *Attorney, Agent, or Firm* — Banner & Witcoff, Ltd.

(57) ABSTRACT

Determining and configuration a transmission period for a communication device may include transmitting measurement data to measure a relay period of a relay device in the network, where the relay period corresponds to an interval of relaying data to another communication device configured to connectable to network. Additionally, the communication device may receive result data indicative of the relay period of the relay device in response to the measurement data from the other communication device, determine the transmission period at which the communication device transmits data to the other communication device based on the relay period, and transmit data to the other communication device via the relay device based on the determined transmission period.

10 Claims, 8 Drawing Sheets

| ATTRIBUTE | ENCODING PERIOD |
|---|---|
| AUDIO | 5ms |
| VIDEO | 15ms |
| IMAGE | 30ms |
| POINTER | 10ms |

231

Fig.8

COMMUNICATION DEVICE, COMPUTER READABLE RECORDING MEDIUM, COMMUNICATION METHOD AND COMMUNICATION SYSTEM

CROSS-REFERENCE TO RELATED APPLICATION

This application is based upon and claims the benefit of priority of Japanese Patent Application No. 2011-013582 filed on Jan. 26, 2011, the contents of which are incorporated herein by reference in its entirety.

BACKGROUND

1. Technical Field

Aspects described herein relate to a communication device, a communication system, a communication method, and a computer readable recording medium configured to configure data transmission conditions in accordance with a network state and to perform communication under the configured transmission conditions.

2. Description of the Related Art

Communication devices capable of adjusting data transmission conditions in accordance with the network state and performing communication under the adjusted data transmission conditions are known. In the related art, for example, a communication device that adjusts a data transmission period in accordance with a communication load on a network has been proposed. The communication device is capable of reducing a data transmission period when the network bandwidth usage rate is low.

In some examples, a relay device that manages relay and transfer of data is located in a network. The relay device temporarily stores data received from a communication device. The stored data is relayed and transferred to another communication device at predetermined intervals. In this case, even if a communication device reduces the transmission period of the data, the relay device relays and transfers data at constant or consistent intervals. Thus, the communication between the communication devices may be delayed because the data transmission speed and timing depends on the constant/consistent transmission intervals of the relay device.

BRIEF SUMMARY

Aspects described herein may provide a communication device configured to be connectable to a network via a relay device which relays data, the communication device comprising a processor configured to control the communication device to transmit measurement data to measure a relay period (which may also be referred to as a relay interval) of the relay device. The relay period may correspond to a period or interval of relaying data received from the first communication device by the relay device to one or more other communication devices configured to be connectable to the network. For example, the relay period may specify the interval or period at which the measurement data is received by an intended destination communication device. In another example, the relay period may specify the interval or period at which the measurement data is relayed by the relay device to the other communication device. The communication device may further be configured to receive result data, indicative of the relay period of the relay device in relaying the measurement data, from the other communication device. According to one or more arrangements, the result data is transferred from the other communication device in response to receiving the measurement data. Based on the relay period, the communication device may further determine the transmission period or interval at which to transfer data from the communication device to the one or more other communication devices. The communication device may then transmit data to the other communication device via the relay device based on the determined transmission period.

According to other aspects, a non-transitory computer readable recording medium may be provided. The computer readable recording medium may store a program (e.g., computer readable instructions) that, when executed, cause a computer of a communication device, connectable to a network via a relay device which relays data, to perform the various functions described.

According to another aspect, a system may be provided to include one or more communication devices configured to determine a transmission period/interval according to a relay period or interval, and one or more relay devices configured to relay data from one communication device to another communication device. Additionally or alternatively, the one or more communication devices may determine a encoding or decoding period/interval based on the relay period.

According to still other aspects, a communication method of a communication device may be provided, where the communication device is configured to be connectable to a network via a relay device. The method may include transmitting measurement data to measure a relay period of the relay device, wherein the relay period specifies a period or interval of relaying data by the relay device from the communication device to another communication device and/or a period or interval at which the other communication device receives the measurement data. The method may further include receiving result data, indicative of the relay period of the relay device in relaying the measurement data, from the other communication device, wherein the result data is transferred from the other communication device in response to receiving the measurement data, determining the transmission period indicative of transferring data from the communication device to the other communication device based on the relay period, and transmitting data to the other communication device via the relay device based on the determined transmission period.

DETAILED DESCRIPTION

One embodiment is described hereinafter with reference to the drawings.

Figure 1:
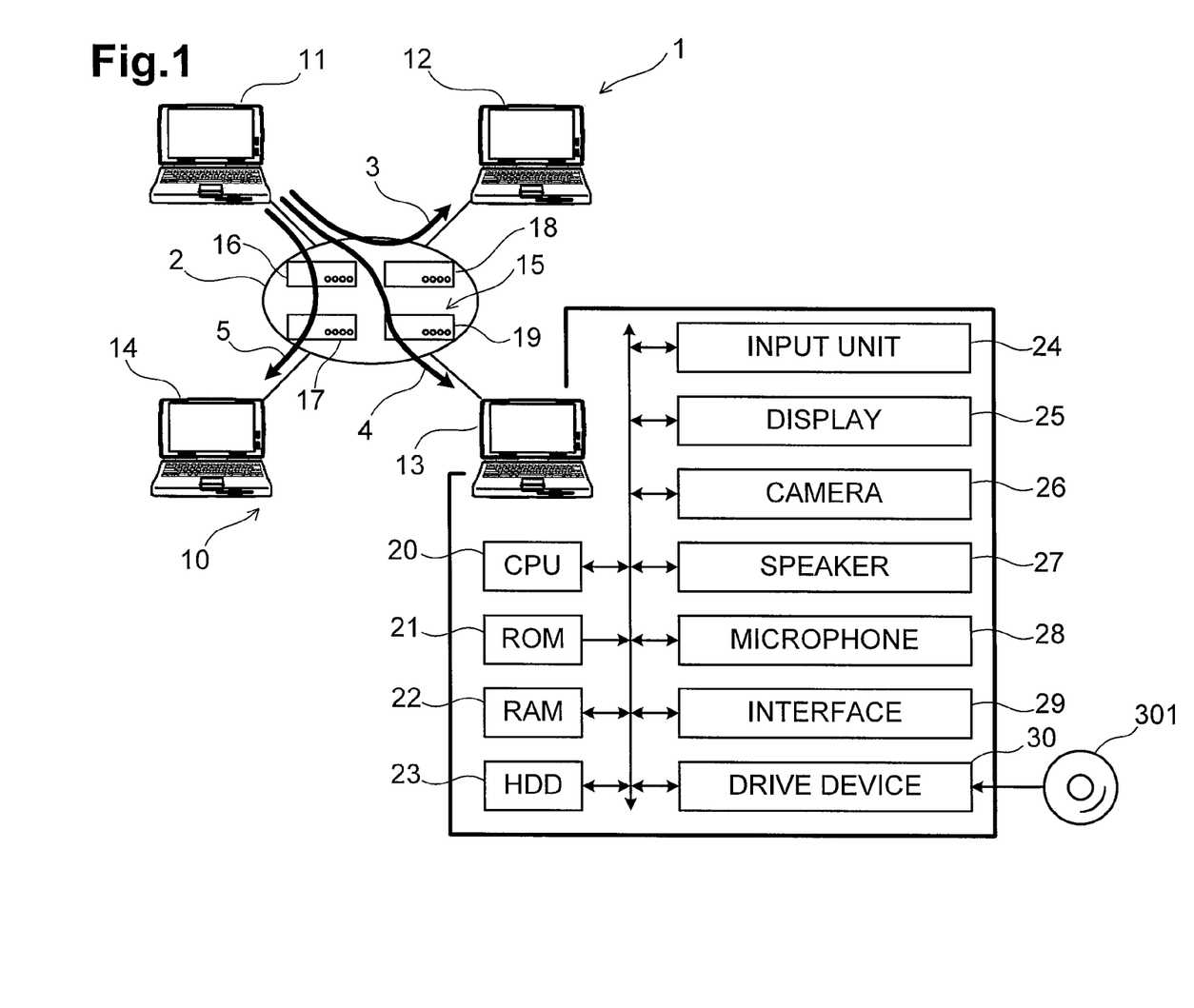
FIG. 1 is a diagram illustrating an example configuration of a communication system and an example electrical configuration of a communication device.

An overview of a communication system 1 is described with reference to FIG. 1. The communication system 1 includes a plurality of communication devices such as communication devices 11, 12, 13, and 14. The communication devices 11, 12, 13, and 14 may be collectively referred to as "a plurality of communication devices 10" or individually as "a communication device 10." A communication device 10 can communicate with another communication device 10 via a network 2. In this embodiment, videoconferencing is provided through communication between a communication device 10 and another communication device 10. Data to be communicated via videoconference includes, for example, video data and audio data. Examples of a communication device 10 may include a personal computer (PC) (e.g., laptop or desktop), mobile communication device (e.g., smartphone, mobile phone) and videoconference-dedicated terminal. In FIG. 1, the labels (11, 12, 13, and 14) of the communication devices 10 also represent identifiers (IDs) of the respective communication devices 10.

Relay devices 16, 17, 18, and 19 and the like are located in the network 2. The relay devices 16, 17, 18, and 19 may be referred to collectively as "a plurality of relay devices 15" or individually as "a relay device 15." A packet transmitted from a communication device 10 to the network 2 is relayed to another communication device 10 by a relay device 15. If a plurality of relay devices 15 exist in a communication path between a communication device 10 and one or more other communication devices 10, a packet transmitted from the communication devices 10 to the network 2 is relayed and transferred by the plurality of relay devices 15 to their intended destination. Consequently, the transmitted packet reaches the other communication device 10. Examples of a relay device 15 may include a bridge, router, and/or server.

A relay device 15 may be configured to temporarily store a received packet (e.g., from a sending device) in a buffer when relaying the received packet (e.g., to a destination/receiving device). The packet stored in the buffer is transmitted by the relay device 15 in a predetermined transmission period. If the relay device 15 receives a plurality of packets in a predetermined period, the relay device 15 assembles data included in the packets into a single packet. Then, the relay device 15 transmits the packet including the assembled data in a predetermined transmission period (e.g., a single transmission period). The predetermined transmission period may differ in each of the plurality of the relay devices 15. A type and a number of the plurality of relay devices 15 located in a communication path may be different on each of the communication paths depending on the needs and configuration of the respective communication path. Therefore, the time period required for a packet transmitted from a communication device 10 to another communication device 10 may differ depending on the communication path. Alternatively or additionally, the predetermined transmission period may be the same between at least some of the relay devices 15.

As illustrated in FIG. 1, the type and number of relay devices 15 located in a communication path 3, the type and number of relay devices 15 located in a communication path 4, and the type and number of relay devices 15 located in a communication path 5 may differ. The communication path 3 is a path between the communication devices 11 and 12. The communication path 4 is a path between the communication devices 11 and 13. The communication path 5 is a path between the communication devices 11 and 14. Therefore, the time period required for a packet transmitted from the communication device 11 to the communication devices 12, 13, and 14 differs on each of the communication paths 3, 4, and 5. The communication paths 3, 4 and 5 are described in further detail below.

An electrical configuration of each of the communication devices 10 is described with reference to FIG. 1. The communication device 10 includes a central processing unit (CPU) 20 that manages control of the communication device 10. The CPU 20 is electrically connected to a read-only memory (ROM) 21, a random access memory (RAM) 22, a hard disk drive (HDD) 23, an input unit 24, a display 25, a camera 26, a speaker 27, a microphone 28, a communication interface (I/F) 29, and a drive device 30. The ROM 21 stores, for example, a boot program, a basic input/output system (BIOS), and an operating system (OS). The RAM 22 stores temporary data such as a timer value and a counter value. The HDD 23 stores a communication program of the CPU 20. The input unit 24 includes a keyboard and a mouse that receive an input from a user. The communication I/F 29 controls the timing at which the communication device 10 communicates with another communication device 10 via the network 2. The drive device 30 is capable of reading information stored in a storage medium 301. The storage medium 301 is a recording medium such as a digital versatile disc (DVD). For example, when the communication device 10 is set up, a communication program stored in the storage medium 301 is read by the drive device 30 and is stored in the HDD 23.

Figure 2:
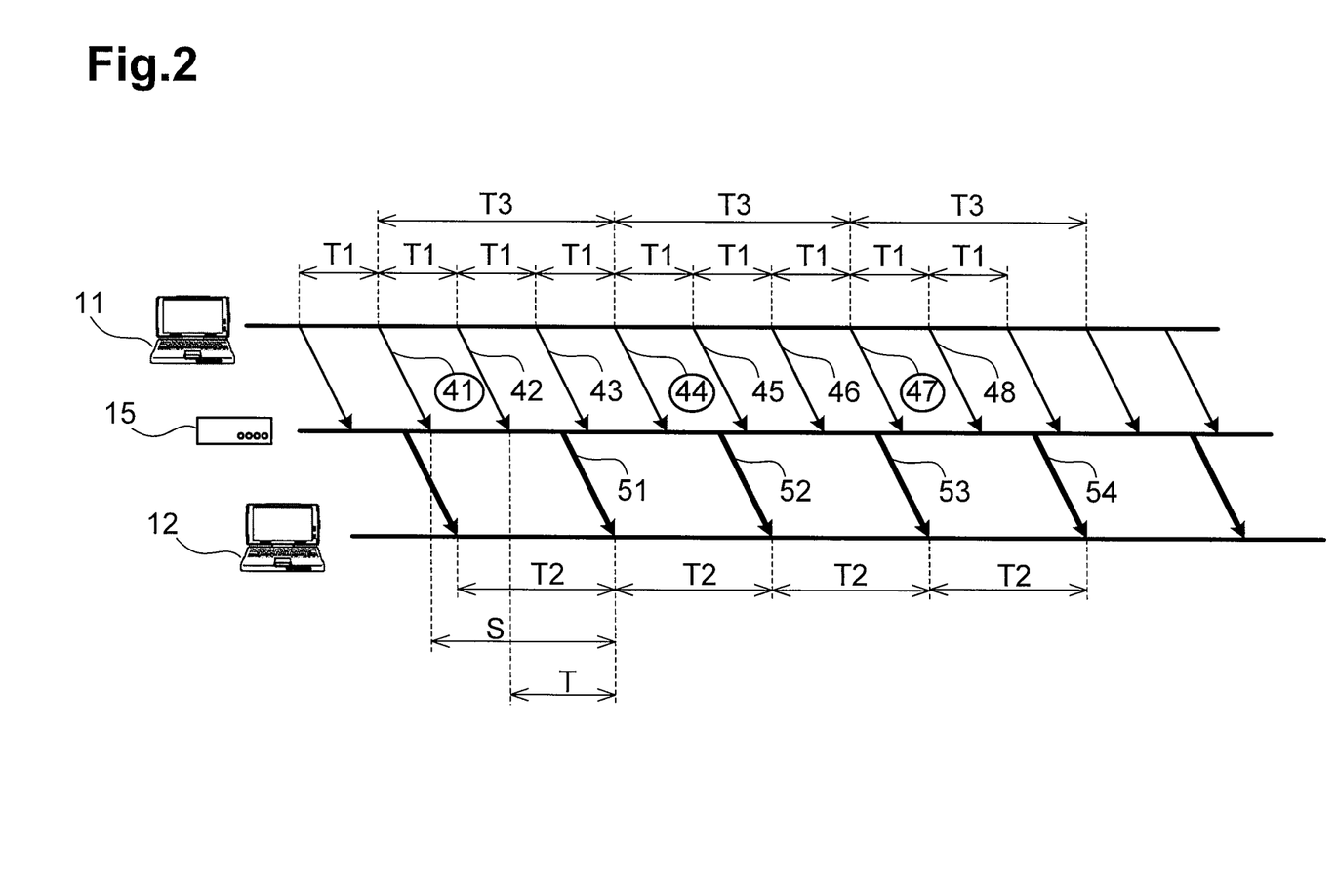
FIG. 2 is a diagram illustrating an example transmission timing of packets between communication devices.
Figure 3:
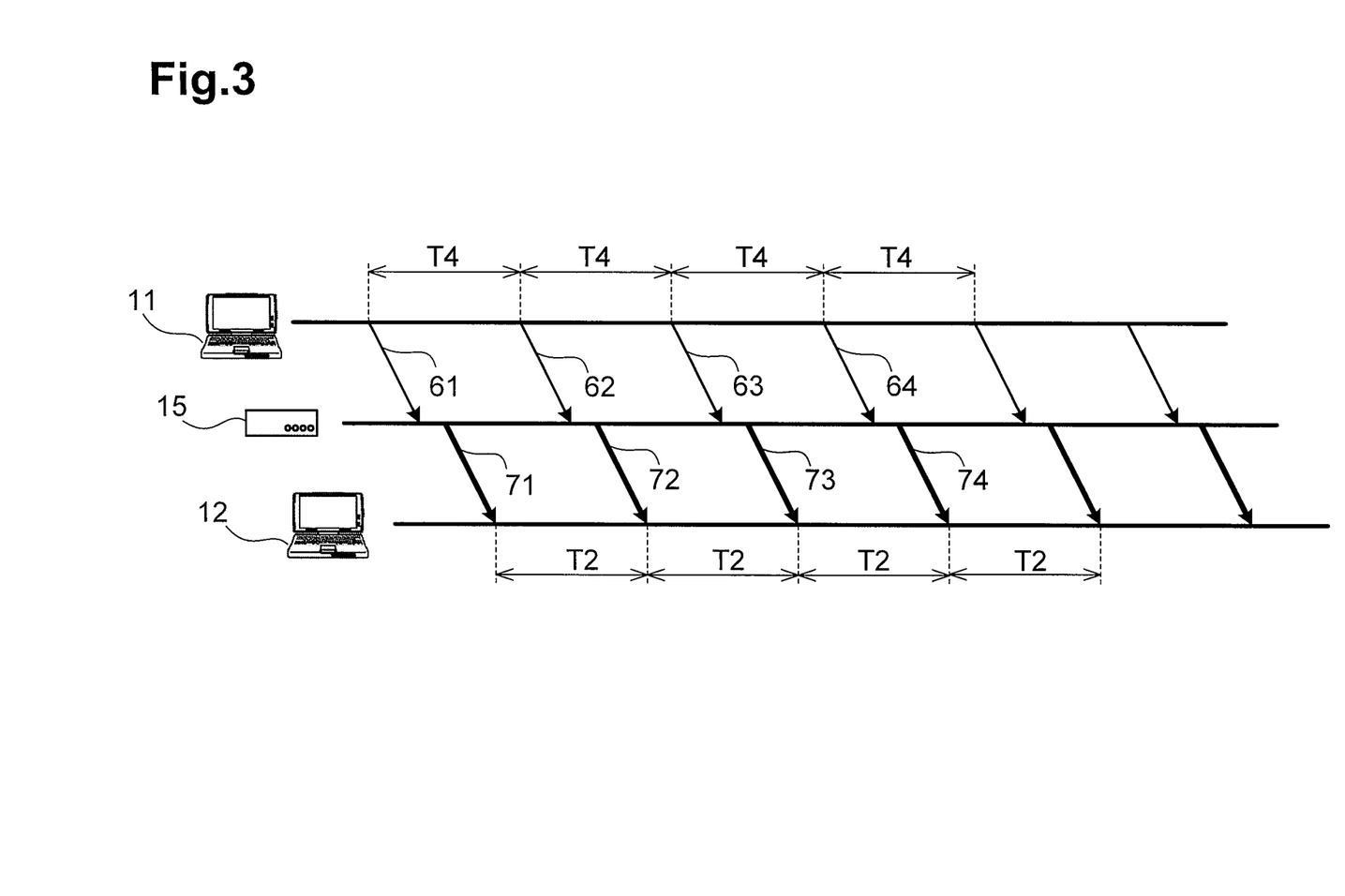
FIG. 3 is a diagram illustrating an example transmission timing of packets between communication devices.
Figure 4:
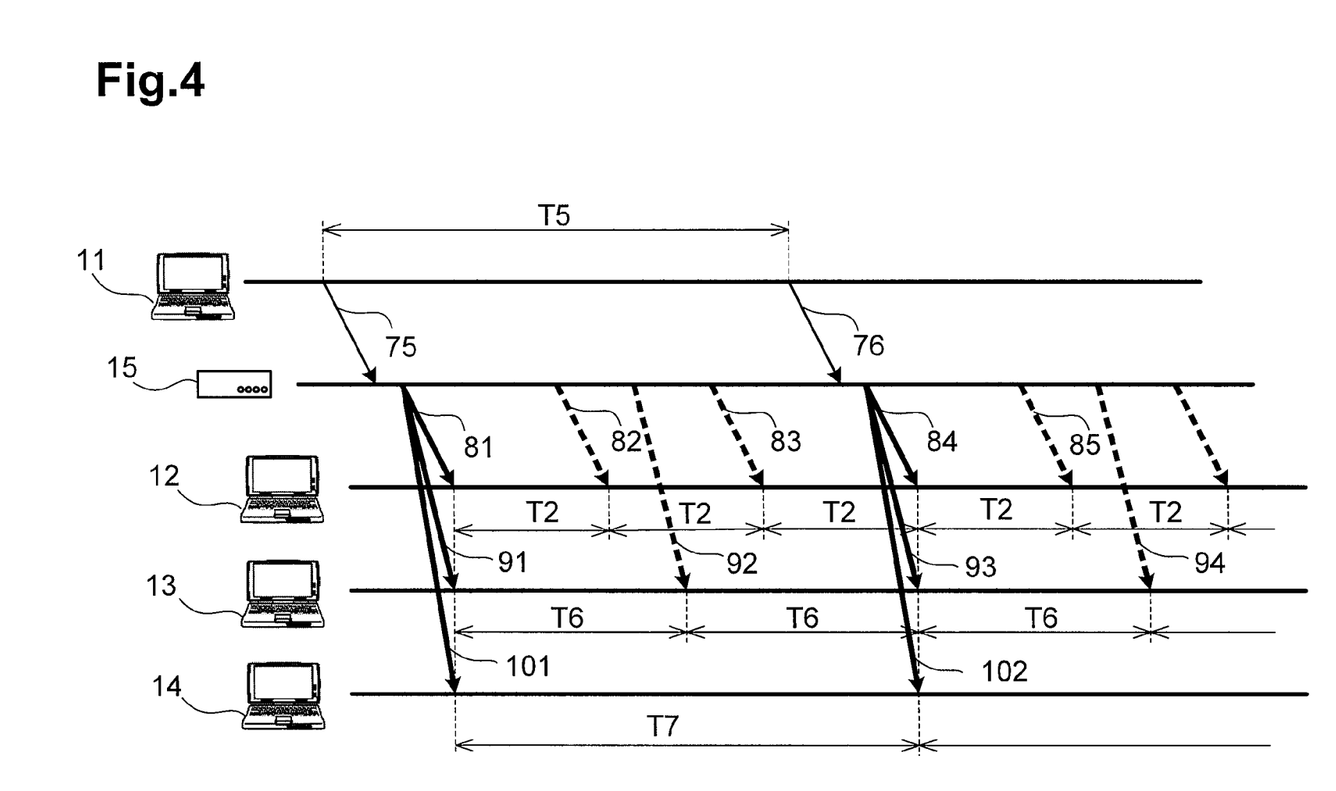
FIG. 4 is a diagram illustrating an example transmission timing of packets between communication devices.

An example of a packet that is relayed by a relay device 15 is described with reference to FIGS. 2 to 4. The arrows illustrated in FIGS. 2 to 4 represent packets transmitted from a communication device 10 or a relay device 15. In FIGS. 2 and 3, packets addressed to the communication device 12 are transmitted from the communication device 11. The relay device 15 relays the packets transmitted from the communication device 11 to the communication device 12. In FIGS. 2 to 4, in the communication path between the communication devices 11 and 12, one or a plurality of the relay devices 15 may exist, and the one or a plurality of the relay devices 15 are collectively represented as a single relay device. The relay devices 15 relay and transfer packets using the following procedure.

Upon receipt of a packet from the communication device 11, a relay device 15 temporarily stores the packet in its buffer. After storing the packet in the buffer, the relay device 15 transmits the stored packet to another relay device 15 at predetermined transmission periods (which may also be referred to as a transmission interval). If a plurality of packets are received by a relay device 15 within a predetermined transmission period and are stored in the buffer, the data included in the stored packets is assembled into a single packet by the relay device 15 that has received the packets. The packet created in this manner may then be transmitted from the relay device 15 that has created the packet to another relay device 15 at a predetermined transmission period (e.g., at the end of the predetermined transmission period during which the plurality packets were received). The above communication may be repeatedly performed among the one or a plurality of the relay devices 15. If a relay device 15 capable of transmitting a packet directly to the communication device 12 receives a packet, the relay device 15 transmits the received packet to a destination device such as the communication device 12 at a predetermined transmission period. Through the above communication, the packet transmitted from the communication device 11 is received by the communication device 12. Since each of the relay devices 15 transmits a packet at a predetermined transmission period, as illustrated in FIGS. 2 to 4, the communication device 12 receives packets at periodic timing intervals.

The period or interval at which the communication device 12 receives a packet is specified based on the transmission periods of all the relay devices 15 located in the communication path between the communication devices 11 and 12. Since each communication path may include a different number of the relay devices 15, the period or interval at which a packet is received may differ from one communication path to another. Therefore, for example, when the communication device 11 transmits a packet to the communication devices 12, 13, and 14, the periods at which the communication devices 12, 13, and 14 receive the packet may be different.

In FIG. 2, the communication device 11 transmits packets to the communication device 12 at intervals of a length equal to a transmission period T1 periodically. In the example illustrated in FIG. 2, for example, the communication device 11 transmits packets 41, 42, 43, 44, 45, 46, 47, 48, etc. at intervals of a length equal to the transmission period T1. The relay device 15 relays the packets to the communication device 12. The communication device 12 receives the packets relayed by the relay device 15 at intervals of a length equal to a reception period T2 periodically. In the example illustrated in FIG. 2, the communication device 12 receives packets 51, 52, 53, 54, etc. The reception period or interval at which the communication device 12 receives the packets is hereinafter referred to as a "relay period" of the relay device 15. In some examples, the relay period may alternatively or additionally relate to the period or interval at which the relay device 15 relays data to the communication device 12. Moreover, the period or interval at which the relay device 15 relays data to a destination communication device may be the same as the period of interval at which the destination communication device receives the data relayed by the relay device 15.

According to one or more arrangements, the relay period T2 is defined based on the transmission periods of all the relay devices 15 located in the communication path. In one example, the relay period T2 is longer than the transmission period T1.

The packet 51 illustrated in FIG. 2 includes the data included in the packet 41 transmitted from the communication device 11, and the data included in the packet 42. Similarly, the packet 52 illustrated in FIG. 2 includes the data included in the packet 43 transmitted from the communication device 11, and the data included in the packet 44. The data included in the packet 41 and the data included in the packet 42 are simultaneously or substantially simultaneously received as the packet 51 by the communication device 12. Therefore, the time period S required for the packet 41 transmitted from the communication device 11 to be received by the communication device 12 is longer than the time period T required for the packet 42 transmitted from the communication device 11 to be received by the communication device 12. In this manner, the relay period T2 is longer than the transmission period T1. A time from when the communication device 11 transmits the packet 41 to when the communication device 12 receives the packet 41 requires time period S. The time period S is longer then the relay period T2. Therefore, a time delay from when the communication device 11 transmits the packet 41 to when the communication device 12 receives the packet 41 may increase. Thus, a time delay may occur in transmission of videoconferencing data from the communication device 11, and can prevent smooth progress of the videoconference. For example, due to the occurrence of a time delay in transmission of audio and video data of users from the communication device 11, a phenomenon can occur that audio is interrupted or video is perceived to be unnatural.

Smooth progress of the videoconference can also be prevented when the relay period T2 is shorter than the transmission period T1.

For example, in FIG. 2, it is assumed that the communication device 11 transmits packets addressed to the communication device 12, for example, the packets 41, 44, and 47 (e.g., packets 42, 43, 45, 46 and 48 are not address to communication device 12), at intervals of a length equal to a transmission period T3.

The transmission period/interval T3 is longer than the relay period/interval T2. In this case, the data included in the packet 41 is stored in the packet 51 and the packet 51 is received at the end of the first relay period T2. The data included in the packet 44 is stored in the packet 52 and the packet 52 is received at the end of the second relay period T2.

In contrast, the packet 53 does not include any packets transferred from the communication device 11 and the communication device 12 receives no packet at the end of the third relay period/interval T2. For example, the data included in the packet 47 is stored in the packet 54 and the packet 54 is received at the end of the fourth relay period/interval T2.

In this manner, the communication device 12 may not be able to periodically receive packets transmitted from the communication device 11 at a regular or intended periodicity or interval. Therefore, when packets for videoconferencing are transmitted from the communication device 11, the intervals at which the packets are received can become unstable, which can prevent smooth progress of the videoconference.

According to aspects of the present embodiment, however, the communication device 11 adjusts the transmission period in accordance with the relay period of the relay device 15. As illustrated in FIG. 3, the communication device 11 obtains (e.g., determines) the length of the relay period T2, and may set the transmission period T3 (see FIG. 2) in accordance with the length of the relay period T2. The communication device 11 transmits packets addressed to the communication device 12, for example, packets 61, 62, 63, 64, etc., at intervals of length equal to a transmission period T4. The communication device 12 receives packets relayed and transferred by the relay device 15, for example, packets 71, 72, 73, 74, etc., at intervals of a length equal to the length of relay period T2. In the example illustrated in FIG. 3, the transmission period T4 coincides with the relay period T2. Therefore, the communication device 12 can receive a packet at intervals of length equal to the length of the transmission period with which the communication device 11 transmits the packet. In this embodiment, therefore, the relay device 15 smoothly relays and transfers packets in accordance with an intended transmission timing and interval. Accordingly, the communication device 11 can reduce packet communication delay, and stabilize the intervals at which the communication device 12 receives packets from the communication device 11. Thus, smooth progress of the videoconference can be achieved.

A method for specifying the relay period of a relay device 15 by using the communication device 11 is described below. The communication device 11 determines, as a transmission period for measurement, the smallest value that can be set as a transmission period. The communication device 11 transmits packets for measurement to the communication device 12 at intervals of a length equal to the determined transmission period. The packets for measurement are hereinafter referred to as "measurement packets". In some examples, the measurement packets may be relayed between relay devices 15. The communication device 12 receives the measurement packets from a relay device 15. The communication device 12 specifies the length of the intervals at which the communication device 12 receives the measurement packets as the relay period of a relay device 15 located in the communication path between the communication devices 11 and 12. The communication device 12 transmits a packet including information about the specified relay period to the communication device 11. A packet containing information about a specified relay period is hereinafter referred to as a "result packet". The communication device 11 receives the result packet via the relay device 15. The communication device 11 sets a transmission period based on the relay period specified in the result packet. The communication device 11 subsequently transmits packets to the communication device 12 at intervals of length equal to the set transmission period.

In the foregoing description, the communication device 12 specifies the length of the intervals at which the communication device 12 receives measurement packets as the relay period of a relay device 15. In some cases, the communication device 12 may not receive all the measurement packets within a predetermined reception period (R) but may receive measurement packets within a period that is an integer multiple of the reception period (n*R, where n=1, 2, . . . ). Additionally or alternatively, a natural number multiple rather than an integer multiple of the reception period may be used since a plurality of relay devices 15 are located in the communication path, the period may change depending on the timing of the transmission periods of the respective relay devices. In this case, the communication device 12 accumulates the reception periods, and subsequently specifies the most frequent reception period/interval as the relay period of the relay device 15.

An example in which packets addressed to the communication devices 12, 13, and 14 are transmitted from the communication device 11 is described with reference to FIG. 4. The relay device 15 relays packets transmitted from the communication device 11 to the communication devices 12, 13, and 14. The relay devices 15 located in the communication path between the communication devices 11 and 12, the relay devices 15 located in the communication path between the communication devices 11 and 13, and the relay devices 15 located in the communication path between the communication devices 11 and 14 are different. Therefore, the relay periods T2, T6, and T7 are different.

The relay period T2 is the relay period of the relay devices 15 located in the communication path between the communication devices 11 and 12. The relay period T6 is the relay period of the relay devices 15 located in the communication path between the communication devices 11 and 13. The relay period T7 is the relay period of the relay devices 15 located in the communication path between the communication devices 11 and 14. The relay period T6 is 1.5 times the relay period T2. The relay period T7 is 3 times the relay period T2.

In the above case, in this embodiment, the communication device 11 specifies the respective relay periods, for example, the relay periods T2, T6, and T7, and calculates the least common multiple of the relay periods. The communication device 11 adjusts a transmission period in accordance with the calculated least common multiple. In FIG. 4, the least common multiple of the relay periods T2, T6, and T7 is the relay period T7. Thus, the communication device 11 can set a transmission period so as to coincide with the relay period T7 (e.g., the length of the transmission period is set as the length of the relay period T7). As discussed herein, the least common multiple may be a least common integer multiple or least common whole multiple.

As illustrated in FIG. 4, the communication device 11 transmits packets addressed to the communication devices 12, 13, and 14 as a packet 75 or 76 at the transmission period T5. The relay device 15 illustrated in FIG. 4 is located in the communication path between the communication devices 11 and 12, the communication path between the communication devices 11 and 13 and the communication path between the communication devices 11 and 14.

Upon receipt of the packet 75 transmitted from the communication device 11, the relay device 15 sets/generates packets 81, 91, and 101. Each of the packets 81, 91 and 101 includes the data contained in the received packet 75. Then, the relay device 15 relays the packet 81 to the communication device 12, the packet 91 to the communication device 13, and the packet 101 to the communication device 14.

Further, as illustrated in FIG. 4, upon receipt of the packet 76 transmitted from the communication device 11, the relay device 15 sets/generates packets 84, 93, and 102. Each of the packets 84, 93 and 102 includes the data contained in the received packet 76. Then, the relay device 15 relays the packet 84 to the communication device 12, the packet 93 to the communication device 13, and the packet 102 to the communication device 14.

In the example illustrated in FIG. 4, the length of the transmission period T5 of the communication device 11 is equal to the length of the relay period T7. Therefore, the communication devices 12, 13, and 14 can receive packets at intervals of length equal to the length of the transmission period T5 at which the communication device 11 transmits the packets. This results in reduced packet communication delay and stabilized intervals at which the communication device 12 receives packets from the communication device 11. In addition, the above process allows the communication device 11 to transmit packets to the communication devices 12, 13, and 14 at intervals of common length. Therefore, the communication device 11 can significantly reduce process load during transmission, compared to when the communication device 11 sets different transmission periods for the communication devices 12, 13, and 14.

According to some aspects, during a videoconference, various types of media data other than audio and video data of users may be transmitted from the communication devices 10. Examples of the media data include data of document images to be referred in the videoconference. Other examples of media data include coordinate data of a pointer pointing to a specific position on a screen. Since the communication devices 10 need to process a plurality of types of data, it may be preferable to have the load during the transmission of data to be as small as possible. In contrast, the communication device 11 can reduce the process load during transmission by setting a common transmission period. Thus, the communication device 11 can efficiently modify multiple pieces of media data and transmit the resulting data to the communication devices 12, 13, and 14.

Further, as described above, the communication device 11 can set as a transmission period a period that is the least common multiple of the plurality of relay periods for the communication devices 12, 13, and 14. Therefore, the communication device 11 can transmit data to any of the communication devices 12, 13, and 14 at intervals of consistent length with reduced communication delay. For example, the intervals may be consistent among all destination communication devices 12, 13 and 14.

In the foregoing description, the communication device 11 sets as a transmission period a period that is the least common multiple of the plurality of relay periods for the communication devices 12, 13, and 14. However, according to some aspects, the communication device 11 may define as a transmission period a period that is a common multiple of the plurality of relay periods for the communication devices 12, 13, and 14. Therefore, the communication device 11 can prevent the transmission period from being significantly reduced. If the transmission period is significantly reduced, the amount of data to be transmitted per unit time is reduced. Therefore, the amount of data included in each packet is reduced. Accordingly, the amount of header to be added to data during communication relatively increases, resulting in increased overhead and low transfer efficiency. To overcome the above inconvenience, the communication device 11 can set the transmission period to a common multiple period instead of a least common multiple period in order to increase the transmission period. Specifically, a period that is an integer multiple of a least common multiple period can be set as a transmission period. Therefore, the communication device 11 can determine a transmission period having a desired length, and can prevent reduction in data transfer efficiency.

In the foregoing description, furthermore, the communication device 11 may encode media data at intervals of length equal to a transmission period determined based on the relay period. Thus, the communication device 11 can efficiently and quickly transmit encoded data to the communication devices 12, 13, and 14. The communication device 11 can also reduce the capacity of a storage device for storing encoded data.

Figure 5:
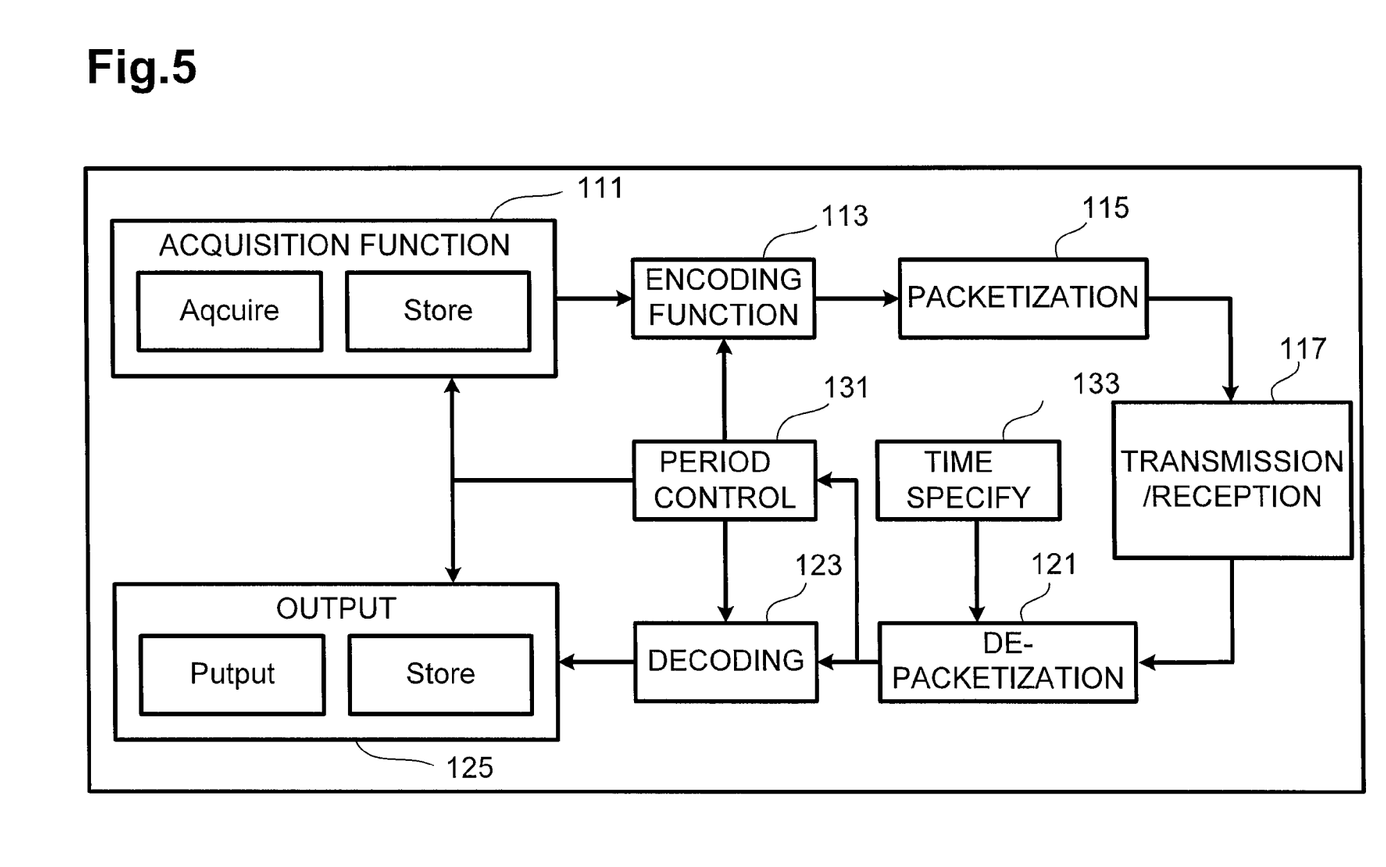
FIG. 5 is a block diagram illustrating example functions performed in each of the communication devices.

Various functions of each of the communication devices 10 and a data flow is described with reference to the example diagram of FIG. 5. The functions illustrated in FIG. 5 are implemented by a processor such as the CPU 20 of the communication device 10. The communication device 10 comprises an acquisition function 111, an encoding function 113, a packetization function 115, a transmission/reception function 117, a de-packetization function 121, a decoding function 123, an output function 125, and a time specifying function 133. Some communication devices 10 may also have a period control function 131. The above functions are described in further detail hereinafter.

A description is given of a case where a packet is transmitted to another communication device 10. The acquisition function 111 acquires original data of data to be included in a packet to be transmitted to another communication device 10. The original data may be, for example, any media data. Examples of original data to be acquired include audio data, video data, image data, and coordinate information. The audio data may be input through the microphone 28. The video data may be captured by using the camera 26. The image data may be data of an image such as a document to be displayed on the display 25 in the videoconference. The image data may be read from the HDD 23. The coordinate information is information for specifying the position of a pointer on the display 25. The coordinate information is specified from the position of the pointer currently displayed on the display 25. The acquired original data is temporarily stored in the RAM 22.

The encoding function 113 encodes the original data stored in the RAM 22. In one example, an optimum encoding method is selected in accordance with the attribute of the original data, and the original data is encoded. The encoding operation may be performed at periodic intervals. The length of the intervals at which the encoding operation is performed is specified based on a period table stored in the HDD 23.

Figure 6:
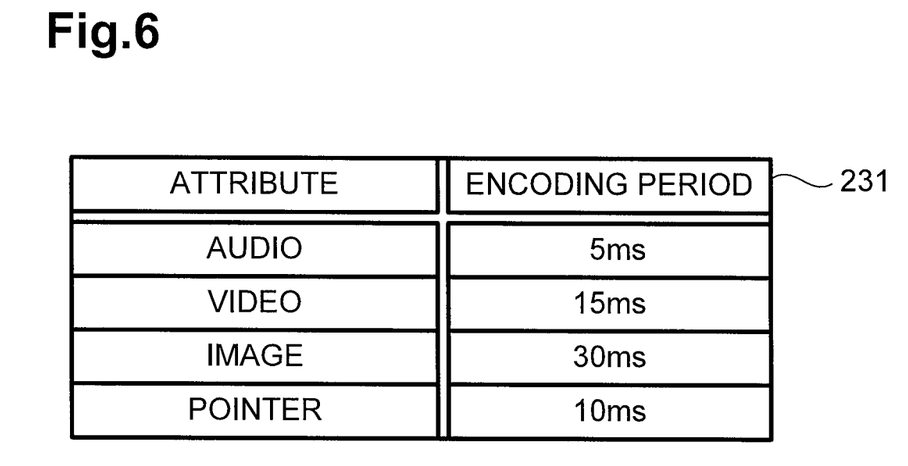
FIG. 6 is a schematic view illustrating an example period table.

An example encoding period table 231 is described with reference to FIG. 6. The encoding period table 231 includes periods by attribute of original data. In the period table 231, the encoding period for original data comprising an attribute that needs to be more frequently updated is shorter. For example, the encoding period for audio is shortest because the audio needs to be encoded at short intervals in order to provide smooth audio output from the speaker 27. On the other hand, images are less frequently changed, and there might not be a problem with quality of display even if the images are encoded at long intervals. Thus, the period for images may be the longest among the types of data shown in period table 231. The CPU 20 specifies the encoding period for each attribute of the original data stored in the RAM 22 in accordance with the period table 231. The original data is encoded in accordance with the specified encoding periods.

As illustrated in FIG. 5, the packetization function 115 creates a packet including encoded data. The packetization function 115 adds header information including destination address information to encoded data. Therefore, a packet is created. The encoded data may be addressed to a plurality of destinations. That is, a packet may be transmitted to a plurality of other communication devices 10. In this case, a plurality of packets each comprising different header information for the associated destination(s) are created. The transmission/reception function 117 transmits the created packet or packets to the other communication device or devices 10 via the communication I/F 29.

After the relay period is acquired from another communication device 10, a packet transmission period is set using the method described with reference to FIGS. 2 to 4 in accordance with the acquired relay period. If relay periods are acquired from a plurality of other communication devices 10, a transmission period may be set based on the least common multiple of the plurality of relay periods. The communication device 10 continuously transmits packets at intervals of length equal to the set transmission period.

A description is given of a case where a packet is received from another communication device 10. The transmission/reception function 117 receives a packet via the communication I/F 29. The de-packetization function 121 removes a header portion from the received packet, and extracts encoded data. The decoding function 123 decodes the encoded data. The decoding operation may be performed, in some instances, at intervals corresponding to those of the encoding operation. The decoding period is specified in accordance with the period table stored in the HDD 23. The decoded data is temporarily stored in the RAM 22.

The output function 125 outputs the decoded data stored in the RAM 22 on an attribute-by-attribute basis. Specifically, the decoded audio is output through the speaker 27. The decoded audio and image are output through the display 25. A position on the display 25 is specified as a pointer position on the basis of the decoded coordinate information. A pointer is displayed at the specified pointer position on the display 25.

The time specifying function 133 measures the reception period of the received packet. By measuring the reception period, the time specifying function 133 specifies the relay period of the relay device 15 located in the communication path to another communication device 10. The specified relay period is transmitted to the other communication device 10 by using the transmission/reception function 117.

The communication device 10 may also comprise the period control function 131 for changing the encoding period and the decoding period in accordance with a transmission period. The encoding period is a period during which the encoding function 113 performs encoding. The decoding period is a period during which the decoding function 123 performs decoding. For example, when the relay period is acquired from another communication device 10, the period control function 131 sets a transmission period based on the acquired relay period. Then, the period control function 131 may perform control so that, in addition to the setting of a transmission period, the encoding operation is subsequently performed at intervals of a length equal to the length of the set transmission period. This enables the communication device 10 to efficiently and quickly transmit the encoded data to another communication device 10.

When another communication device 10 sets a transmission period, the period control function 131 may acquire the set transmission period. In this case, the period control function 131 may perform control so that the decoding operation is performed at intervals of length equal to the length of the acquired transmission period. This enables the communication device 10 to synchronize the encoding period with the decoding period, thus preventing the storage of a large amount of encoded data and allowing efficient and quick decoding.

The period control function 131 may further determine an acquisition period and an output period based on a transmission period. In this case, the acquisition period is a period during which the acquisition function 111 acquires the original data. The output period is a period during which the output function 125 outputs decoded data. For example, upon receipt of information about the relay period from another communication device 10, the period control function 131 sets the transmission period using the received information about the relay period. Then, the period control function 131 may perform control so that, in addition to the setting of the transmission period, the original data can be subsequently acquired at intervals of length equal to the length of the set transmission period. This allows the communication device 10 to acquire the original data at the timing of encoding and to efficiently encode the original data. When the transmission period is set by another communication device 10, the period control function 131 may acquire the set transmission period. In this case, the period control function 131 may perform control so that decoded data can be output at intervals of length equal to the length of the acquired transmission period. This allows the communication device 10 to output decoded data at the timing of decoding. This can prevent inconveniences such as unintended interruption of audio and video and unnatural perception of audio and video, and enables smooth seamless videoconferencing.

Figure 7:
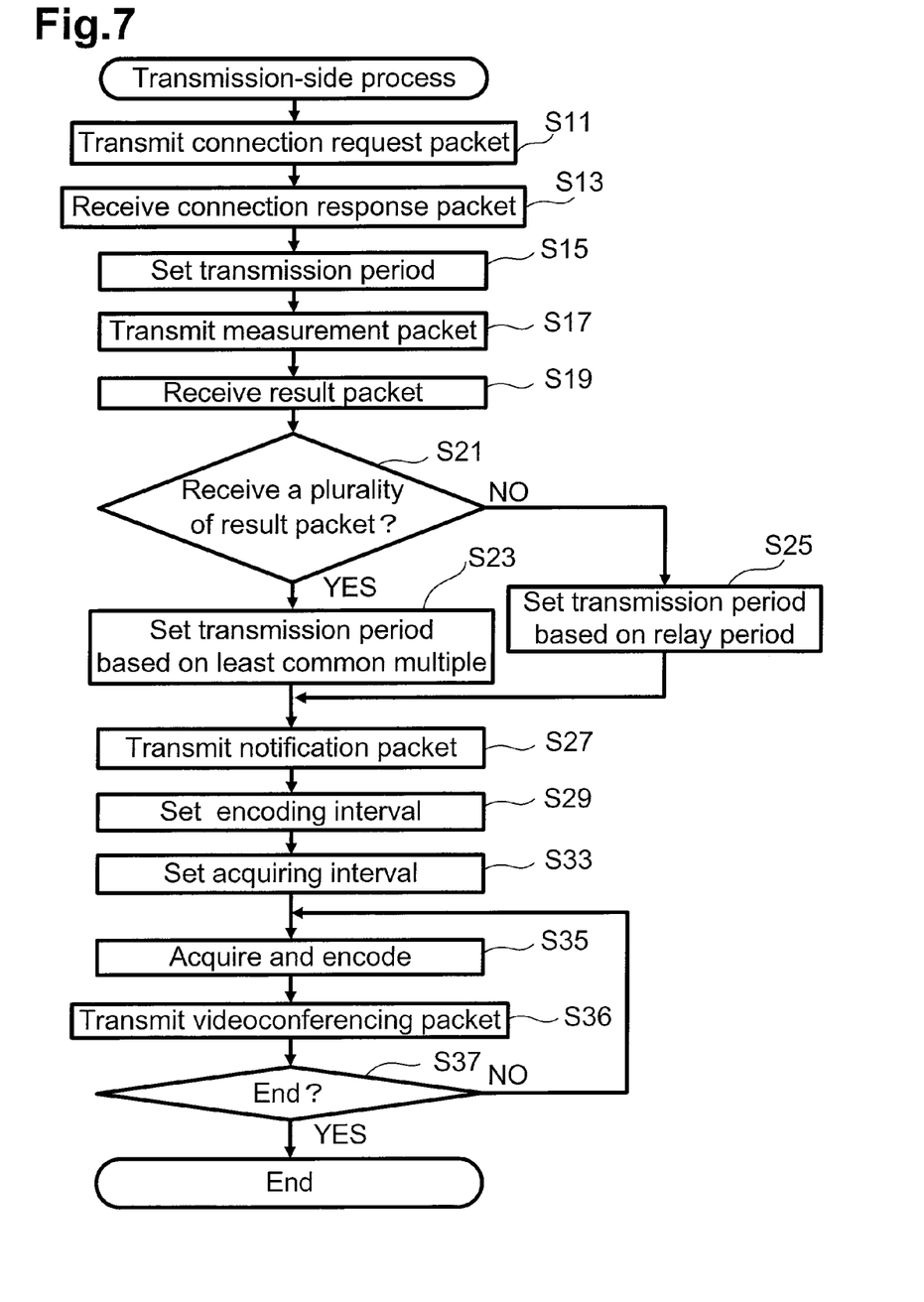
FIG. 7 is a flowchart illustrating an example transmission-side process.
Figure 8:
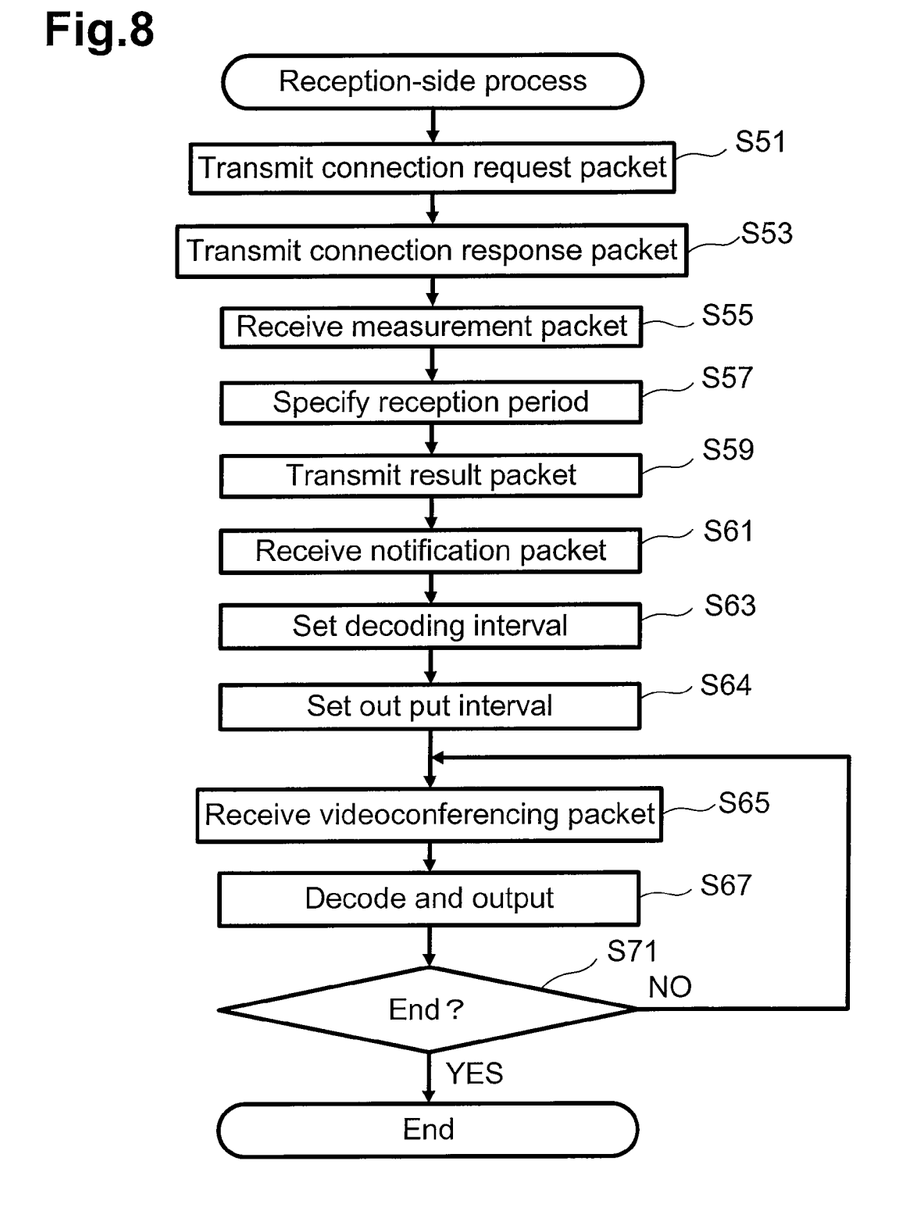
FIG. 8 is a flowchart illustrating an example reception-side process.

A process (e.g., performed by the CPU 20 of the communication device 10) is described with reference to FIGS. 7 and 8. When a videoconferencing application is set up in the communication device 10, a transmission-side process (see FIG. 7) and a reception-side process (see FIG. 8) are started and performed by the associated CPU 20. The transmission-side process and the reception-side process may be performed in parallel.

The transmission-side process is described with reference to FIG. 7. First, in step S11, to connect a session with another communication device 10 with which a videoconference is to be started, a connection request packet may be transmitted to the other communication device 10. In step S11, if there are a plurality of other communication devices 10 with which a videoconference is to be started, the connection request packet may be transmitted to all of the other communication devices 10 as well.

After the transmission of a connection request packet, in step S13, a connection response packet is received. The connection response packet is returned from the other communication device 10 that has received the connection request packet. In accordance with the receipt of the connection response packet in step S13, a session with the other communication device 10 is established. Subsequently, the transmission and reception of packets to and from the other communication device 10 are enabled.

In step S15, the transmission period of a measurement packet for measuring the relay period is set. In one example, in step S15, the shortest period among the encoding or decoding periods stored in the period table is set as a transmission period of a measurement packet. For example, if the period table 231 (see FIG. 6) is referred to, the shortest encoding period of 5 ms (data attribute: audio) is selected. Then, the selected encoding period is set as the transmission period of a measurement packet. The method of determining a transmission period of a measurement packet is not limited to the method described above, and may be set in other ways, including use of a predetermined transmission period (for example, 1 ms).

Then, in step S17, a plurality of measurement packets are transmitted to the other communication device 10 at intervals of length equal to the length of the transmission period set in step S15. If a session has been established with a plurality of other communication devices 10, in step S17, measurement packets are transmitted to each of the other communication devices 10. In some examples, each of the measurement packets may include dummy data. The dummy data is data comprising substantially the same size as the size of data expected to be contained in packets to be transmitted and received during the videoconference. This allows the simulation of packets to be actually transmitted and received during the videoconference, leading to more accurate measurement of the relay period.

After the measurement packets have been transmitted to the other communication device 10, in step S19, the result packet returned from the other communication device 10 is received. If the measurement packets have been transmitted to a plurality of other communication devices 10, in step S19, the result packets are received from the respective other communication devices 10. Then, the relay period is extracted from the result packet. The result packet is transferred by the relay device 15 located in the communication path. The relay period extracted in the above manner corresponds to the reception period of the measurement packets received by the other communication device 10.

In step S21, it is determined whether or not the result packets have been received from a plurality of other communication devices 10. If result packets have been received from a plurality of other communication devices 10 (YES in step S21), the least common multiple of the plurality of relay periods extracted from the plurality of result packets is calculated. Then, in step S23, the transmission period set in step S15 is set to a new transmission period based on the calculated least common multiple. Then, the process proceeds to step S27.

If result packets have not been received from a plurality of other communication devices 10, that is, if the result packet has been received from only a single other communication device 10 (NO in step S21), the processing of step S25 is performed. In step S25, the transmission period set in step S15 is set based on the relay period extracted from the result packet. Therefore, a new transmission period is set. The process proceeds to step S27. In step S27, a notification packet including the transmission period set in step S23 or S25 is transmitted to the other communication device to which the measurement packets were transmitted in step S17.

In step S29, a functional block for managing the encoding process is set so that the original data can be encoded at intervals of length equal to the length of the transmission period set in step S23 or S25. The functional block set in step S29 is the encoding function 113 illustrated in FIG. 5, for example, an encoder. Further, in step S33, the functional block for managing the acquisition of original data is set so that the original data can be acquired at intervals of length equal to the length of the transmission period set in step S23 or S25. The functional block set in step S33 is, for example, the acquisition function 111 illustrated in FIG. 5.

In step S35, the original data is acquired at intervals of length equal to the length of the period set in step S33, and is encoded at intervals of length equal to the length of the period set in step S29. As a result, a videoconferencing packet is created. In step S36, the created videoconferencing packet is transmitted to the other communication device 10 (e.g., at the set transmission period).

In step S37, it is determined whether or not the videoconference is to be terminated. If an instruction for terminating the videoconference is input by a user through the input unit 24 or if a disconnection request packet is received from the other communication device 10, it is determined that the videoconference is to be terminated. The disconnection request packet is a packet for disconnecting the currently established session. If an instruction for terminating the videoconference has not been input and if a disconnection request packet has not been received from the other communication device 10 (NO in step S37), the process returns to step S35, and videoconferencing packets are continuously transmitted (e.g., at the set transmission period). If an instruction for terminating the videoconference is input (YES in step S37), a disconnection request packet is transmitted to the other communication device 10. The session is disconnected, and the videoconference is terminated. Then, the transmission-side process ends. If a disconnection request packet has been received from the other communication device 10 (YES in step S37), the session is disconnected, and the videoconference is terminated. Then, the transmission-side process ends.

The reception-side process of a communication device is described with reference to FIG. 8. In step S51, the connection request packet transmitted from another communication device 10 is received. Then, in step S53, if the establishment of a session with the other communication device 10 has been acknowledged by a user, a connection response packet is transmitted to the other communication device 10. This enables establishment of a session with the other communication device 10. Subsequently, the transmission and reception of packets to and from the other communication device 10 are enabled.

In step S55, a plurality of measurement packets are received from the other communication device 10 with which the session has been established. Then, in step S57, the reception period during which the measurement packets are received is specified. For example, the reception period indicates the interval at which the measurement packets are received. The specified reception period corresponds to the relay period of the measurement packets transferred by the relay device 15 located in the communication path. In step S59, the result packet including information about the specified relay period is transmitted to the other communication device 10.

Then, in step S61, the notification packet transmitted from the other communication device 10 is received. Then, in step S61, the transmission period is extracted from the received notification packet. For example, the transmission period may specify the interval at which data (e.g., packets) are transmitted from the other communication device 10. In step S63, the functional block for managing the decoding process is set so that the decoding operation can be performed at intervals of length equal to the length of the extracted transmission period. For example, in step S63, the decoding function 123 (for example, a decoder) illustrated in FIG. 5 is set as the functional block. In step S64, the functional block for managing the output of decoded data is set so that decoded data can be output at intervals of length equal to the extracted transmission period. In step S64, for example, the output function 125 illustrated in FIG. 5 is set.

In step S65, the videoconferencing packet transmitted from the other communication device 10 is received. In step S67, the data contained in the received packet is decoded at intervals of length equal to the length of the period set in step S63, and is output at during intervals of length equal to the length of the period set in step S64. In step S71, it is determined whether or not the videoconference is to be terminated. If an instruction for terminating the videoconference has not been input and if the disconnection request packet has not been received from the other communication device 10 (NO in step S71), the process returns to step S65, and videoconferencing packets are continuously received. If an instruction for terminating the videoconference has been input (YES in step S71), a disconnection request packet for disconnecting the currently established session is transmitted to the other communication device 10. The session is disconnected, and the videoconference is terminated. Then, the reception-side process ends. If the disconnection request packet has been received from the other communication device 10 (YES in step S71), the session is disconnected, and the videoconference is terminated. Then, the transmission-side process ends.

As described above, a communication device 10 transmits measurement packets to another communication device 10, and receives a result packet to specify the relay period of the relay device 15. The communication device 10 can define the transmission period based on the relay period of the relay device 15. If packets are transmitted from the communication device 10 at intervals of a period shorter than the relay period, the period during which the other communication device 10 receives the packets is longer than the transmission period of the packets. Thus, packet communication delay increases. In contrast, if packets are transmitted from the communication device 10 at intervals of a period longer than the relay period, the intervals at which the other communication device 10 receives the packets are unstable. In either case, the quality of the videoconference conducted through packet communication is reduced. However, if packets are transmitted from the communication device 10 at intervals of a specified relay period, the packets are smoothly relayed and transferred by the relay device 15. Therefore, communication delay is reduced, and the intervals at which the other communication device 10 receives the packets are stabilized (e.g., consistent). Accordingly, the communication device 10 can smoothly execute an application implemented through packet communication. The communication device 10 can further prevent inconveniences such as reduced packet size and increased overhead, which may result from the reduction in the transmission period.

When the relay periods corresponding to a plurality of other communication devices 10 have been acquired, the communication device 10 calculates the least common multiple of the acquired relay periods. Then, the communication device 10 can define the value of the calculated least common multiple as a length of the transmission period. Therefore, packets can be transmitted to any of the plurality of other communication devices 10 at stable intervals with reduced communication delay. The communication device 10 can transmit packets to a plurality of other communication devices 10 under common transmission conditions, and can therefore significantly reduce the process load during transmission.

Aspects described herein are not limited to the foregoing embodiment, and a variety of modifications can be made. In the above embodiment, the measurement packet contains dummy data. However, the measurement packet may, alternatively or additionally, include videoconferencing data. This allows the communication device 10 to measure the relay period while also transmitting the videoconferencing data to another communication device 10.

In the above embodiment, the communication device 10 sets the transmission period to a period which is an integer multiple of an acquired relay period. Alternatively, if the relay period is larger than a predetermined threshold, the transmission period may be set based on a period stored in a period table. For example, the transmission period may be set based on the shortest or longest period among the periods stored in the period table. Alternatively or additionally, if the relay periods corresponding to a plurality of communication devices 10 have been acquired, the transmission period may be set based on the shortest or longest relay period among the relay periods. Still further, the transmission period may also be set using a preset upper limit.

The transmission period may not necessarily be made exactly identical to the relay period or a period that is a common multiple of the relay period. Rather, the transmission period may be set to a value in a certain range including the relay period or a period that is a common multiple of the relay period.

Although an illustrative embodiment and examples of modifications have been described in detail herein, the scope of the invention is not limited thereto. It will be appreciated by those skilled in the art that various modifications may be made without departing from the scope of the invention. Accordingly, the embodiment and examples of modifications disclosed herein are merely illustrative.

What is claimed is:

1. A communication device comprising:
    a processor; and
    memory storing computer readable instructions that, when executed by the processor, cause the communication device to:
        transmit, to a plurality of other communication devices, measurement data to measure a relay period of a relay device in a network through which the communication device is connectable to transmit data, wherein the relay period corresponds to an interval at which the relay device relays data from the communication device to one or more other communication devices configured to connect to the network;
        receive multiple sets of result data from the plurality of other communication devices, the multiple sets of result data indicative of a plurality of relay periods of the relay device in relaying the measurement data;
        determine a transmission period at which the communication device is to transmit data from the communication device to one or more of the other plurality of other communication devices by:
            determining a common integer multiple of the plurality of relay periods based on the received multiple sets of result data; and
            setting the transmission period to the determined common integer multiple of the plurality of relay periods; and
        transmit further data to the one or more of the plurality of other communication devices based on the determined transmission period.

2. The communication device according to claim 1, wherein the multiple sets of result data are respectively transferred from the plurality of other communication devices in response to receiving the measurement data.

3. The communication device of claim 1, wherein determining the common integer multiple of the plurality of relay periods includes determining a least common integer multiple of the plurality of relay periods.

4. The communication device according to claim 1, wherein determining the transmission period includes:
    determining a least common multiple of the plurality of relay periods; and
    setting the transmission period to the determined least common multiple.

5. The communication device according to claim 1,
    wherein the communication device is configured to connect to the plurality of other communication devices using peer to peer communication via the network, and
    wherein the communication device is configured to transmit the further data to the one or more of the plurality of other communication devices using peer to peer communication.

6. The communication device according to claim 1, wherein the instructions, when executed by the processor, further cause the communication device to:
    set the determined transmission period as an encoding period;
    encode the data according to the encoding period; and
    transmit the encoded data to the one or more of the plurality of other communication devices via the relay device based on the determined transmission period.

7. A non-transitory computer readable recording medium storing computer readable instructions that, when executed, cause a communication device to:
    transmit, to a plurality of other communication devices, measurement data to measure a relay period of a relay device in a network through which the communication device is connectable to transmit data, wherein the relay period corresponds to an interval at which the relay device relays data from the communication device to one or more other communication devices configured to connect to the network;
    receive, from the plurality of other communication devices, multiple sets of result data indicative of a plurality of relay periods of the relay device in relaying the measurement data;
    determine a transmission period at which the communication device is to transfer data from the communication device to one or more of the plurality of other communication devices by:
        determining a common integer multiple of the plurality of relay periods based on the received multiple sets of result data; and
        setting the transmission period to the determined common integer multiple of the plurality of relay periods; and
    transmit further data to the one or more of the plurality of other communication devices based on the determined transmission period.

8. A method comprising:
    transmitting, by a communication device to a plurality of other communication devices, measurement data to measure a relay period of a relay device in a network through which the communication device is connectable to transmit data, wherein the relay period corresponds to an interval at which the relay device relays data from the communication device to one or more other communication devices configured to connect to the network;

receiving, from the plurality of other communication devices, multiple sets of result data indicative of a plurality of relay periods of the relay device in relaying the measurement data;

determining a transmission period at which the communication device is to transfer data from the communication device to one or more of the plurality of other communication device by:

determining a common integer multiple of the plurality of relay periods based on the received multiple sets of result data; and setting the transmission period to the determined common integer multiple of the plurality of relay periods; and transmitting further data to the one or more of the plurality of other communication devices based on the determined transmission period.

9. A communication system comprising:
a first communication device; and
a plurality of second communication devices, wherein the first communication device and the plurality of second communication devices are configured to be connectable to a network via a relay device which relays data, wherein the first communication device comprises:
a first processor; and
memory storing computer readable instructions that, when executed by the first processor, cause the first communication device to:

transmit, to the plurality of second communication devices, measurement data to measure a plurality of relay periods of the relay device, wherein the plurality of relay periods correspond to intervals at which the relay device relays data from the first communication device to the plurality of second communication devices;

receive, from the plurality of second communication devices, multiple sets of result data indicative of the plurality of relay periods of the relay device in relaying the measurement data;

determine a transmission period at which the first communication device is to transfer data to one or more of the plurality of second communication devices by:

determining a common integer multiple of the plurality of relay periods based on the received multiple sets of result data; and setting the transmission period to the determined common integer multiple of the plurality of relay periods; and transmit further data to the one or more of the plurality of second communication devices based on the determined transmission period, and wherein each of the one or more of the plurality of second communication devices comprises:
a second processor; and
memory storing computer readable instructions that, when executed by the second processor, cause a corresponding second communication device to:

receive the measurement data from the first communication device;

transmit the result data from the corresponding second communication device to the first communication device;

receive the further data from the first communication device after transmitting the result data; and control output of the received further data.

10. The system of claim 9, wherein the instructions stored in the memory of the corresponding second communication, when executed by the second processor, further cause the corresponding second communication device to:

receive an indication of the determined transmission period; and set a decoding period for decoding the further data based on the determined transmission period.

* * * * *